(No Model.) 4 Sheets—Sheet 3.
N. G. ROSS.
MACHINE FOR MAKING BARBED WIRE.
No. 273,765. Patented Mar. 13, 1883.
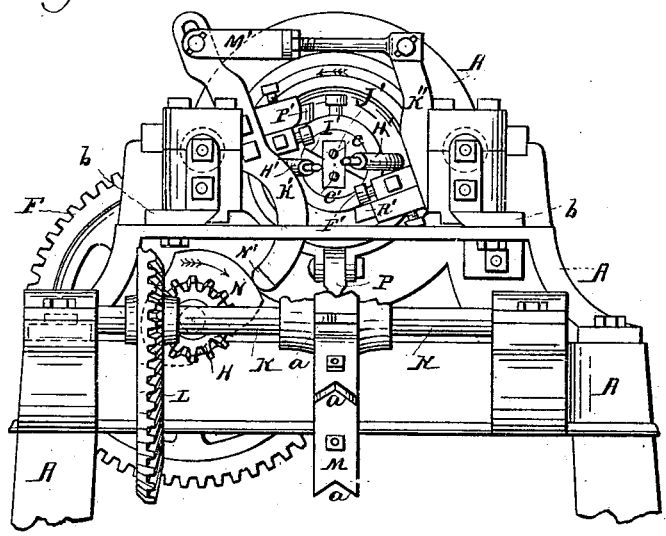
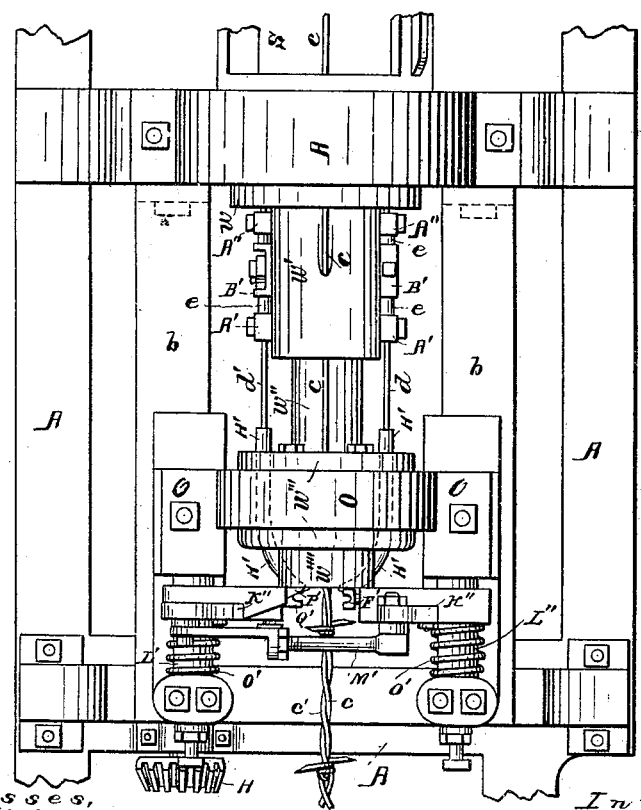
Witnesses,
Henry Frankfurter
J. B. Halfpenny
Inventor
Noble G. Ross
per F. F. Warner
his Attorney,
N. PETERS. Photo-Lithographer, Washington, D. C.

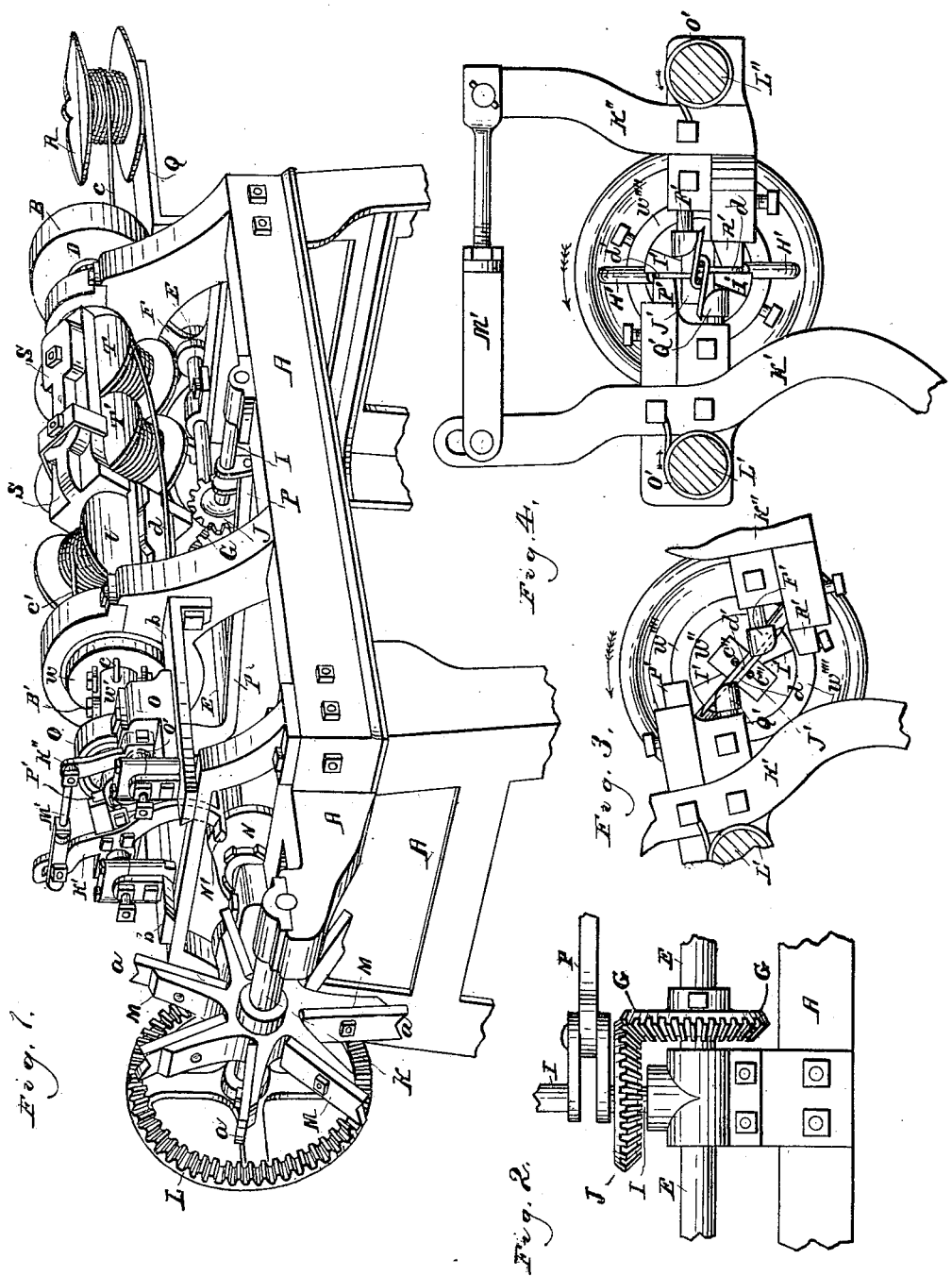

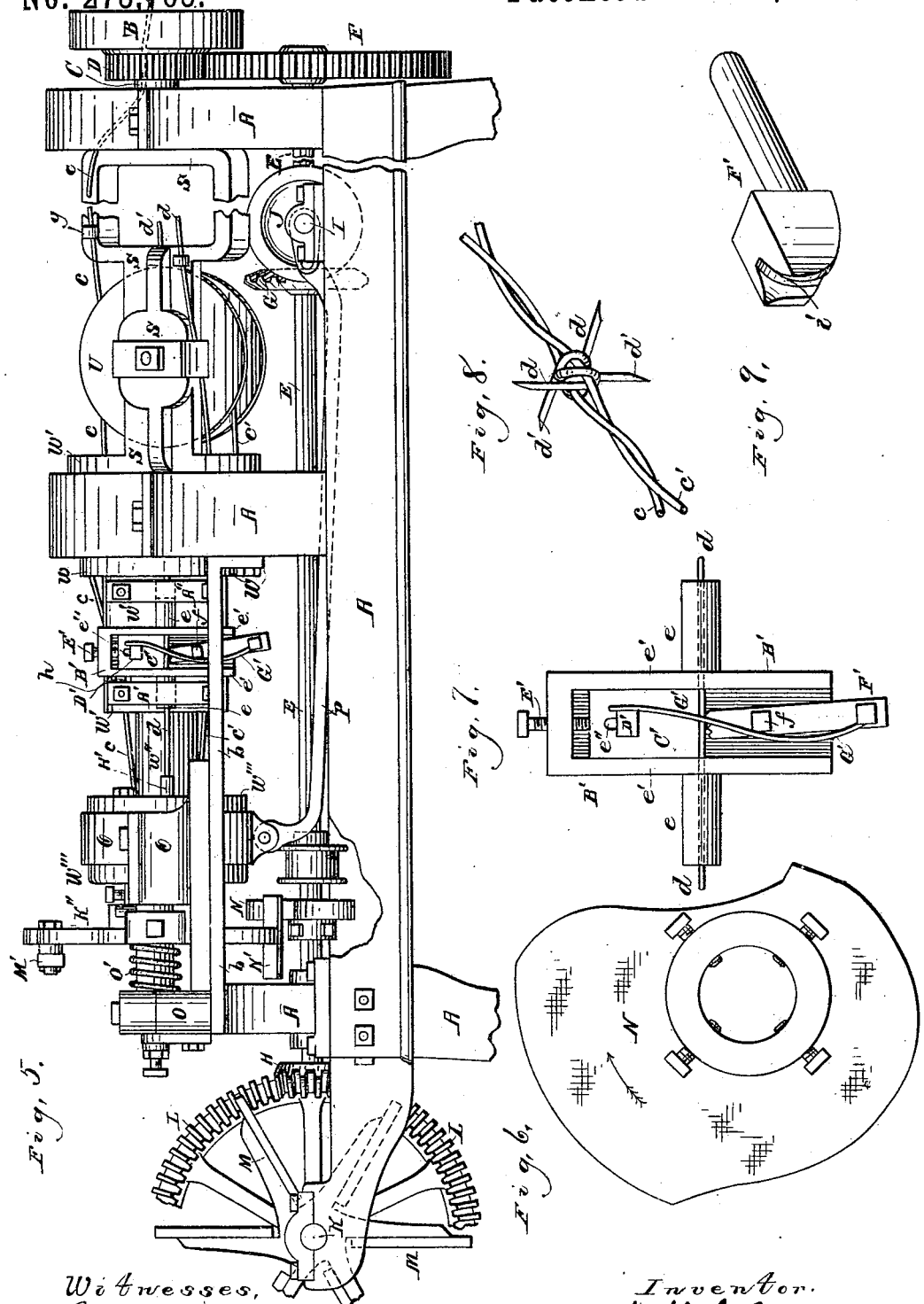

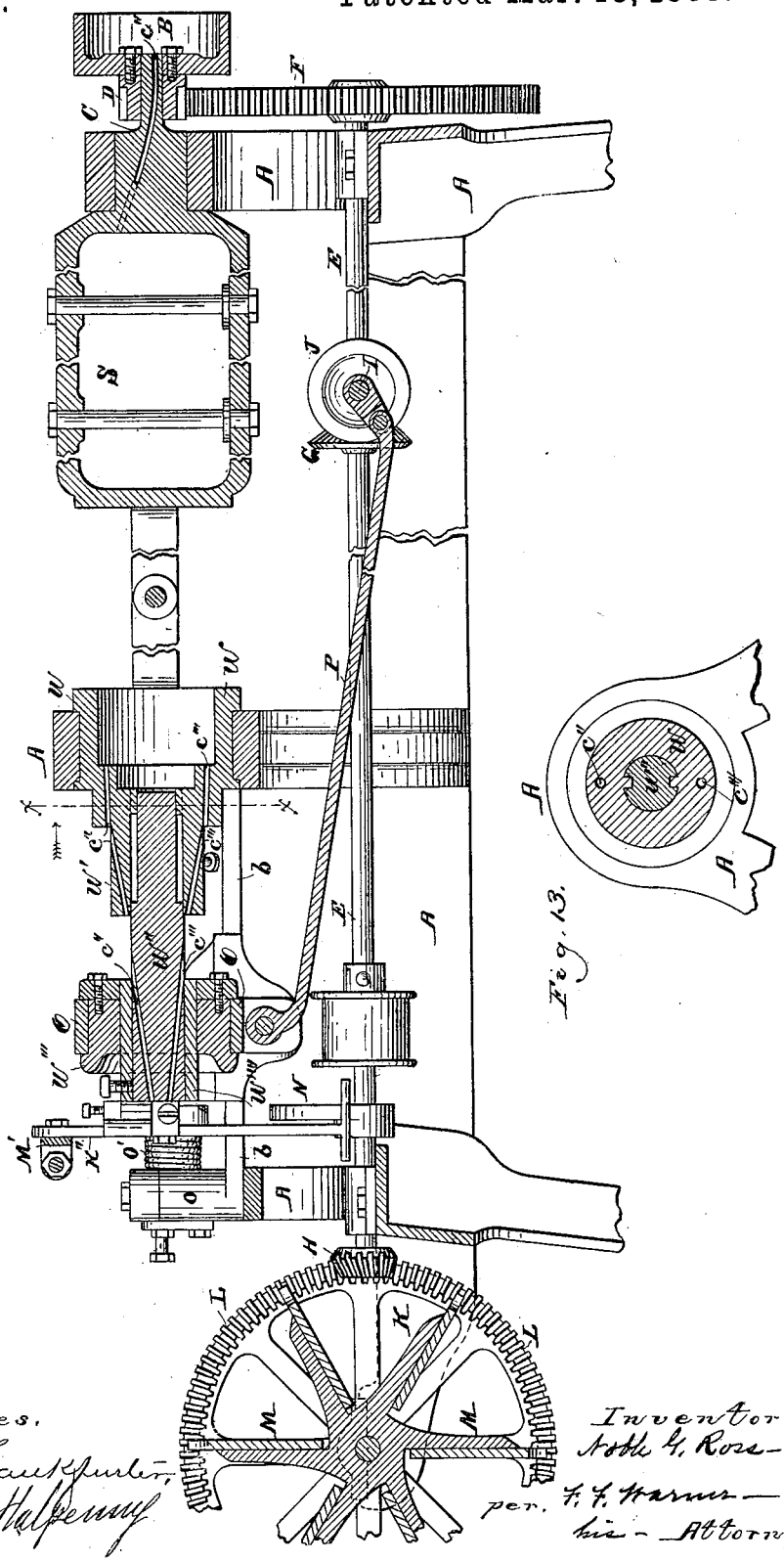

UNITED STATES PATENT OFFICE.

NOBLE G. ROSS, OF CHICAGO, ILLINOIS.

MACHINE FOR MAKING BARBED WIRE.

SPECIFICATION forming part of Letters Patent No. 273,765, dated March 13, 1883.

Application filed July 13, 1882. (No model.)

*To all whom it may concern:*

Be it known that I, NOBLE G. ROSS, of Chicago, in the county of Cook and State of Illinois, have invented certain new and useful Improvements in Machines for Making Barbed Wire, of which the following, in connection with the accompanying drawings, is a specification.

In the drawings, Figure 1 is a perspective representation of a machine embodying my improvements Fig. 2 is a top view of the crank and its driving-gearing. Fig. 3 is a front view of the head of the rotary twister. Fig. 4 is a like representation, also showing the barb-benders and knives. Fig. 5 is a side elevation of the machine. Fig. 6 is a side view of the cam detached. Fig. 7 is a detail of one of the barb-wire pinchers. Fig. 8 is a perspective representation of a specimen of the product of the machine. Fig. 9 is a detail of one of the barb-benders. Fig. 10 is a front elevation of the machine. Fig. 11 is a top view of the forward part of the machine. Fig. 12 is a vertical central longitudinal section of the machine when one strand-wire is directly over the other, and Fig. 13 is a section in the plane of the line $x\ x$ of Fig. 12.

Like letters of reference indicate like parts.

My invention relates to that class of machines which twist together the strands, forming a double wire or cable, and simultaneously apply barbs thereto. My object is to improve the construction and operation of such machines in several respects; and my invention consists in the means which I employ for that purpose, and which I have hereinafter set forth in my claims.

A represents the frame of the machine, which may be made in any way suited to support the moving and working parts.

B is a belt-wheel for driving the machine; and C is a short shaft having a bearing in the rear end of the frame, and on which the wheel B is rigidly secured.

D is a cog-wheel or pinion, also rigidly applied to the shaft C.

E is a shaft turning in bearings in the lower part of the frame, and F, G, and H are cog-wheels rigidly applied thereto.

I is a crank-shaft, and J is a beveled gear, made rigid thereon and engaged by the wheel G. The wheel F is engaged by the wheel D.

K is a shaft turning in bearings at the forward end of the machine, and L is a large cog-wheel, rigidly mounted thereon and engaged by the wheel H. The shaft K also carries the radial arms M M, the ends of which are forked or notched, as is clearly shown at *a a*, Fig. 1. The wheels J, G, H, and L are mitered or beveled, as shown.

N is a cam rigidly applied to the shaft E.

O is a yoke, cross-head, or carriage, which is capable of being moved back and forth on longitudinally-arranged bars or supports *b b*, forming a part of the frame A.

P is a pitman connecting the crank I and the cross-head O.

The diameters of the wheels D and F are such that the latter is rotated only once around while the former is rotated three times. Seven rotations of the wheel H produce one rotation of the wheel L. The wheels J and G are equal in diameter.

Q is an arm or bracket supporting a spool, R, on which is wound a cable-strand, *c*. The axle of this spool stands vertically and turns in the arm Q.

S is a flier or open frame, and T and T' are spools on which are wound the wires for making the barbs. U is a spool on which is wound the second cable-strand. The axle of each spool T T' and U turns freely in the frame or flier S. The second cable-strand is represented at *c'*, and the barb-wires at *d* and *d'*. All of these spools are removable.

W and W' are solid cylindrical extensions of the frame or flier S, and are rigidly attached to the forward end thereof, the part W turning in a central bearing in the frame A.

W'' is a solid cylinder or mandrel, entering the forward end of the part W', and sliding longitudinally therein. This cylinder W'' is keyed or splined to the part W', so as to be rotated thereby without interference with the sliding movement of the said cylinder therein.

W''' is a collar or journal rigidly attached to forward part of the cylinder W''. This collar turns in and is carried back and forth by the yoke O, and this moves back and forth the cylinder W'' in the part W'.

W'''' is a supplemental collar, rigidly attached to the forward end of the cylinder W''. The rear end of the flier or frame S is rigidly secured to the short shaft C, and the said flier and the parts W, W', W'', W''', and W'''' are all thereby rotated on one and the same axis.

Projecting laterally from the part W'' are the ribs or raised parts A' A''; and B' B' are sliding blocks, on which are the hollow spindles or guides e e. The outer faces of these blocks are sunken, and between the raised parts e' e' of these faces are the sliding blocks C' C' in which are the slots e'' e''.

D' D' are set-screws, studs, or pins passing through the slots e'' e'' and entering the blocks B' B'.

E' E' are screws entering one end of each block B' B', and the inner ends of these screws rest against the blocks C' C'.

F' F' are dogs pivoted to the blocks B' B', and G' G' are springs resting at one end against one side of screw-heads D' D', and against the extended pivot f of the dogs F' F', and attached to the outer ends of the said dogs, all of which is clearly shown in Figs. 5 and 7. The spindles e e freely enter the raised parts A' A', so as to permit the blocks B' B' to slide back and forth between the said parts, between which and the said blocks a considerable space exists, as shown in Figs. 5 and 11.

H' H' are bent or curved tubes passing through the collar W'''.

I' I' are fixed cutters or blades set in the forward end of the cylinder W''.

J' is a plate, also set in the same end of the said cylinder, and in this plate are two holes, c'' c'''.

K' and K'' are levers, and L' and L'' are lateral extensions on which the said levers are fulcrumed.

M' is an extensible arm or pitman connecting the upper ends of the levers K' and K''. The lower end of the lever K' has a horizontal arm, N', resting on the cam N.

O' O' are coiled springs, connected at one end to the levers K' K'' and at the other to the carriage O. The lever K' carries the knife or cutter P' and the barb-wire bender Q', and the lever K'' carries the cutter R' and the barb-wire bender F'.

The wire c passes from its spool R through the axle C, thence to an eye, g, on the flier S, thence through the parts W, W', and W'', and thence out through the hole c''. The wire c' passes from its spool U through the parts W, W', and W'', and out through the hole c'''. Both these wires are then carried to the arms M M. It will be perceived that the holes c'' and c''' are a little more than twice the distance of their diameters apart, and are also arranged in a line at or nearly at right angles to a line passing across the forward ends of the tubes H' H', and that this relation or relative position is always retained during the rotation of the machine. It will also be perceived that if the outer ends of the strands c and c' be held they will by twisted together by the rotatory movement of the machine, and that a two-strand cable or double wire will be formed by drawing these wires out from the machine suitably while they are being twisted. It will also be perceived that the tubes H' H', if projected or extended, would pass between the wires c and c' if there should be space enough between the latter to admit thereof. The wire d passes from its spool T along outside the frame S, thence through the part W into the rear spindle, e, and between the block c and the dog F', and out through the forward spindle, e, and into the tube H' upon that side of the machine. The wire d passes in a similar manner along the other side of the machine, and through like parts. These wires d and d', which are those from which the barbs are made, when arranged in the manner shown and described, will, at their forward ends, project through tubes H' H', as indicated in Figs. 3, 4, and 10, and if projected far enough they will pass between the wires c and c'. The strands c c' are drawn out through the machine mechanically by means of the arms M M being laid in the notches a a. It is to be understood of course that the arms M M perform this function because they engage the barbs on the twisted and barbed portions of the strands, the distance between the arms M being at least equal to the distance between the barbs. As the arms M M are rotated constantly during the operation of the machine, the cable-wires are continually being drawn out through the holes c'' c'''. In practice a reel may be located below the arms M M to receive the barbed wires. The barb-wires d and d' are fed intermittently. The curvature of the tubes H' H' is such that these wires will be drawn forward from their spools, instead of out of the tubes, when the carriage O is advanced by the pitman P. During a portion of the back-stroke of the pitman P the barb-wires, instead of being thrust out through the tubes H' H', will be drawn back and slackened behind the part w. This slackening occurs because these wires are rigid enough not to pass through the tubes H' H' without further aid than the mere retreating movement of the carriage O, and the wires referred to are not exposed sufficiently forward of the part w to be there bent or kinked, but behind it there is sufficient exposure to permit slackage. When the carriage O retreats the barb-wires are pinched by the dogs F' F.' These wires, therefore, are prevented from slipping through the blocks B' B' during the rearward movement of the carriage O; but the said blocks themselves are then free to slip or be drawn back by the wires until the rear edges of the said blocks reach the ribs A'' A'', when further rearward movement both of the blocks and of the wires referred to ceases. This cessation, however, occurs before the pitman P completes its back-stroke. Hence the wires during the remaining portion of that stroke are thrust out through the open ends of the tubes H' H', and are projected between the wires c and c', the carriage O then being drawn back upon the barb-wires, which, as just stated, are then stationary. In Fig. 10 the wires d and d' are represented as they appear soon after the blocks B' B' have reached the stops A''

A″ in the manner just described. In Fig. 3 they are represented as they are when the carriage O is at the end of its back movement. In Fig. 4 the wires $d$ and $d'$ are shown when ready to be cut or severed, the carriage O having hardly reached the end of its forward movement, as will hereinafter be explained, and in Fig. 11 the carriage O has begun its back movement, the said wires having been cut. When the carriage O begins to move forward the wires $d$ and $d'$ will be drawn forward also, as they are then in the position shown in Fig. 3, and as the tension is not sufficient to draw them from the tubes H′ H′, and their position in the said tubes is not then altered. During this movement the barb-wires, in sliding through the blocks B′ B′, draw those blocks forward against a set-screw, $h$, entering the inner side of the stop or rib A′, and thereafter the wires continue to slide through the said blocks until the carriage O reaches the end of its forward movement.

It will be perceived that without the blocks B′ B′ the barb-wires would be slackened during the entire back movement of the carriage, and hence would neither be projected out through the open ends of the tubes H′ H′ nor be fed or drawn forward from their spools, the slackage being made on each back movement, and that slackage being taken up on the forward movement. Some dog, therefore, should be employed to stop these wires from being carried back during the whole back movement of the carriage; but I do not here intend to restrict myself to the particular form of dog herein described, as others of any well-known and suitable construction and operation may be employed instead for the same purpose. I employ the sliding blocks B′ B′ and their dogs for the reason that it may not always be expedient to have the barb-wires fed out to an extent corresponding to the whole back movement of the carriage O, and by thus making provision for lost motion I am able to vary the length the wires in the barbs. For example, while the carriage O travels back and moves with it the barb-wires that part of its movement is not effective on those wires, and such an absence of effect follows because the blocks B′ B′ slip back during a part of the back movement of the carriage. The distance over which the blocks B′ B′ move I regulate and vary by means of the screw $h$, screwing it in or out of the part A′ a greater or less distance, according to the extent of lost motion desired or required.

During the operation of the machine the cam N is continually rotated in the direction indicated by the arrow (shown in Figs. 6 and 10,) and the arm N′ rests thereon constantly, being held in contact therewith by means of the springs O′ O′. The levers K′ and K″ are thus vibrated. The cutter P′ is higher than the cutter R′, and the bender T′ higher than the bender Q′, as indicated in Figs. 4 and 10. When the arm N′ stands on that part of the cam N which has the greater diameter the knives P′ and R′, as well as the benders Q′ and F′, stand away from the wires which project from the head of the machine, as shown in Fig. 10. As the cam N rotates it holds the levers K′ and K″ in that position for a little while, and then allows the said knives and formers to move nearer to the wires and near enough for the benders to catch the free end of the barb-wires which project between the cable-wires. This reciprocal action of the barb-benders and the rotary and back and forth movement of the head, in connection with the dogs, the cutters, and the arms M M, results in the twisting of the cable-strands and in the barbs being applied thereto at suitable intervals. By the time these ends are sufficiently coiled the cam N allows the knives P′ and R′ to move still nearer to the cable-wires, and holds them there until those wires are cut by being carried against them by the rotation of the head of the machine. These cuts are made easily, as the wires $d$ and $d'$ are thus brought between two cutters or blades, those upon the levers and the cutters I′ I′. This last movement, which is a sudden one, owing to the form of the cam N, throws the benders Q′ and T′ a little out or away from the wires, as the benders are applied below and the cutters above the center on which the levers turn. By the time the barbs are completely bent or formed they are cut from the remaining parts of the barb-wire, and when cut they are in such a position that they may be drawn forward or away from the benders and pass to the arms M M. The carriage O then retreats and the operations now described are repeated. It may be stated that the barb-wires, while being bent, aid in pushing the benders away at the proper time, which is as soon as the cam N will permit, the cam being formed and set to admit of such movement. The knives P′ and R′ should move closely to the knives I′ I′. It will be observed on reference to Fig. 9 that the barb-benders have a flaring groove, $i$, in their ends to receive the barb-wires while bending them. The corners of the benders should also by preference be rounded off or beveled, as there shown. The points of the barbs, as will be perceived, will be cut diagonally.

Having now described the construction, location, and operation of the various parts or members of the machine, it may be stated, finally, that when the different parts of the driving mechanism are of such size with relation to each other as has already been described there will be three twists between each two succeeding barbs; but the distance between the barbs may be varied by varying the size of the running-gearing.

It is to be understood that many parts of the machine are removable, and that some are adjustable; but I have not referred particularly to such details of construction for the reason that those familiar with the art will be able from the foregoing description and on reference to the drawings to apply the essential features of my invention to use.

Although a reel, as stated, may be employed to receive the barbed wire, such a reel is not essential; neither is it essential that when used it should form a part of or be rotated by the machine now described. The machine is compact and comparatively light, and may with advantage be mounted on a truck and drawn from post to post along or near the line to be occupied by a barbed-wire fence. To use the machine in that manner, I adjust or arrange the wires as described, and make a few feet of barbed wire by turning the machine by hand. The end of this barbed wire I fasten to one of the said fence-posts, and then draw the machine along near the line of posts, first so setting the barbs upon the arms M M that the barbs will rotate these arms as the fence-wire is thus drawn out from the machine. The rotation of these arms rotates the shaft K and the wheels L and H, and hence the whole machine will be set in operation the same as when driven by the wheel B, the wheels B and H being the terminals in the train of wheels which constitute the driving-gearing.

It may also be here stated that this machine will apply barbs consisting of only one wire, when only one barb-wire is provided or arranged in the machine.

As the cylinder W'' is solid with the exception of the separate channels through which the wires c and c' pass, the head of the machine may be said to be solid, instead of hollow or tubular.

Having thus described my invention, what I claim as new, and desire to secure by Letters Patent, is—

1. The combination, substantially as specified, in a machine for making barbed wire, of the shaft E, the wheels F and G, rigidly mounted on the said shaft, the crank-shaft I, the wheel J, rigidly mounted on the said shaft, and engaging the wheel G, the pitman P, and the head, yoke, or carriage O, in connection with gearing for rotating the shaft E, the said machine having a flier, consisting at its forward end of the cylinder W'', adapted for rotation in and reciprocation by the said yoke, substantially as and for the purposes specified.

2. The combination, substantially as specified, in a machine for making barbed wire, of the rotary cam N, the pivoted levers K' and K'', carrying barb-cutters and barb-benders, and a rotary head provided with passages for the main wires, and carrying cutters or blades I' I', and also provided with means for feeding the barb-wires to the cable-strands, the said levers and head being mounted on a reciprocating carriage, for the purpose specified.

3. The combination, substantially as specified, in a machine for making barbed wire, of the pivoted levers K' and K'', and the knives and barb-benders applied thereto, and a solid rotary and reciprocating head, having therein the bent tubes H' H' and the channels or holes c'' and c''', the said levers and head being mounted on the same sliding carriage, substantially as and for the purposes specified.

4. The combination, substantially as specified, in a machine for making barbed wire, of the yielding and pivoted levers K' and K'', and their connecting-bar and knives and blades, the sliding carriage O, the rotary head W'', having therein the tubes H' H', the openings c'' c''', and the knives I' I', the cam N, and the pitman P and its shaft, for the purposes specified.

5. The combination, substantially as specified, in a machine for making barbed wire, of the pivoted and connected levers K' and K'', carrying barb cutters and benders, the cam N, the carriage O, the reciprocating and rotary head W'', having therein the bent tubes H' H', and the openings c'' c''', and the knives I' I', and the sliding blocks B' B', having therein the dogs F' F' and the blocks C' C', for the purposes specified.

NOBLE G. ROSS.

Witnesses:
F. F. WARNER,
H. FRANKFURTER.